United States Patent
Dybvik et al.

(10) Patent No.: US 9,876,281 B2
(45) Date of Patent: Jan. 23, 2018

(54) SYSTEM AND METHOD FOR REDUCING THE PROBABILITY OF DETECTION OF A COMMUNICATION AND SENSOR MAST

(71) Applicant: Comrod AS, Tau (NO)

(72) Inventors: Tor Mathias Dybvik, Abu Dhabi (AE); Jan Ove Sjöberg, Vikarbyn (SE)

(73) Assignee: Comrod AS, Tau (NO)

( * ) Notice: Subject to any disclaimer, the term of this patent is extended or adjusted under 35 U.S.C. 154(b) by 64 days.

(21) Appl. No.: 14/908,638

(22) PCT Filed: Aug. 6, 2014

(86) PCT No.: PCT/NO2014/050139
§ 371 (c)(1),
(2) Date: Jan. 29, 2016

(87) PCT Pub. No.: WO2015/020533
PCT Pub. Date: Feb. 12, 2015

(65) Prior Publication Data
US 2016/0172751 A1    Jun. 16, 2016

Related U.S. Application Data

(60) Provisional application No. 61/955,512, filed on Mar. 19, 2014, provisional application No. 61/863,995, filed on Aug. 9, 2013.

(51) Int. Cl.
*H01Q 3/02* (2006.01)
*H01Q 3/04* (2006.01)
(Continued)

(52) U.S. Cl.
CPC .............. *H01Q 3/04* (2013.01); *H01Q 1/1242* (2013.01); *H04B 10/112* (2013.01); *H04K 3/224* (2013.01);
(Continued)

(58) Field of Classification Search
CPC ........... H01Q 3/04; H01Q 1/1242; H01Q 3/02
See application file for complete search history.

(56) References Cited

U.S. PATENT DOCUMENTS 6,046,706 A    4/2000  Vargas
6,888,512 B1*  5/2005  Daigler ................ H01Q 1/1242
                                                    343/878

(Continued)

OTHER PUBLICATIONS

International Search Report for PCT/NO2014/050139 dated Nov. 28, 2014.
(Continued)

*Primary Examiner* — Hoang Nguyen
(74) *Attorney, Agent, or Firm* — Andrus Intellectual Property Law, LLP

(57) ABSTRACT

A system and method are for reducing the probability of detection of a Line of Sight type communication and sensor mast. The mast has an upper portion extending upwardly relatively the ground, and a lower portion closer to the ground than the upper portion. The mast at the upper portion is equipped with at least a communication or sensor element. The mast is equipped with an actuator that, based on calculated instructions, is designed to alter the elevation above ground of the mast upper portion so as to achieve an acceptable signal quality with the upper portion of the mast at the lowest possible elevation.

14 Claims, 2 Drawing Sheets

(51) Int. Cl.
  *H04B 10/112* (2013.01)
  *H01Q 1/12* (2006.01)
  *H04K 3/00* (2006.01)
  *G01S 13/02* (2006.01)
(52) U.S. Cl.
  CPC .............. *H04K 3/25* (2013.01); *H04K 3/827* (2013.01); *G01S 2013/0281* (2013.01); *H04K 2203/32* (2013.01); *H04K 2203/36* (2013.01)

(56) References Cited

U.S. PATENT DOCUMENTS

| | | |
|---|---|---|
| 2005/0093766 A1 | 5/2005 | Turner |
| 2008/0084787 A1 | 4/2008 | Graber |
| 2011/0007157 A1* | 1/2011 | Sekelsky ................ G01C 15/00 348/143 |

OTHER PUBLICATIONS

Written Opinion for PCT/NO2014/050139 dated Nov. 28, 2014.
International Preliminary Report on Patentability for PCT/NO2014/050139 dated Aug. 20, 2015.

* cited by examiner

SYSTEM AND METHOD FOR REDUCING THE PROBABILITY OF DETECTION OF A COMMUNICATION AND SENSOR MAST

FIELD

There is provided a system for reducing the probability of detection of a communication and sensor mast. More precisely there is provided a system for reducing the probability of detection of a line of sight type communication and sensor mast, the mast having an upper portion extending upwardly relatively the ground, and a lower portion closer to the ground than the upper portion, where the mast at the upper portion is equipped with at least a communication or sensor element. The invention also includes a method for reducing the probability of detection of a line of sight type communication and sensor mast.

BACKGROUND

Some communication and sensor systems depends on Line of Sight (LoS) or near LoS signal propagation. These includes systems that employ electromagnetic signals at relatively high frequencies. The term "communication and sensor mast" is here defined to be a mast that carries equipment for a system relying on LoS or near LoS signal propagation such as communication systems, radar systems, cameras and other sensor systems".

Systems relying on LoS signal propagation often have to be positioned on a mast that is elevated above the ground. The word ground also includes sea in this context.

When such systems are utilized for defence purposes, the elevation may increase the probability of detection and thus for harmful physical and electronic attacks. Electronic attacks are often termed Electronic Warfare.

SUMMARY

The purpose of the invention is to overcome or reduce at least one of the disadvantages of the prior art.

The purpose is achieved according to the invention by the features as disclosed in the description below and in the following patent claims.

According to a first aspect of the invention there is provided a system for reducing the probability of detection of a line of sight type communication and sensor mast, the mast having an upper portion extending upwardly relatively the ground, and a lower portion closer to the ground than the upper portion, where the mast at the upper portion is equipped with at least a communication or sensor element, wherein the mast is equipped with an actuator that, based on calculated instructions, is designed to alter the elevation above ground of the mast upper portion. The actuator is used to alter the elevation of the mast so as to achieve an acceptable signal quality with the upper portion of the mast at the lowest possible elevation.

The calculated instructions may be based on data from radio propagation analysis or data from a geospatial database. In these cases feedback is not utilized.

A geospatial database is database that includes a 3D map or contour data.

The calculated instructions may also include feedback data such as Received Signal Strength Indication data, bit error rate or other measure of the quality of the communication channel or the sensor input.

In the case a camera is used, the feedback could come from a video tracking system.

The communication or sensor element at the upper portion of the mast may, apart from the elevation above ground setting, require an initial setting of the elevation angle relative the horizon and azimuth direction setting. These initial settings of the elevation above ground, elevation angle relative the horizon and azimuth direction may be calculated in a mission planning system. Settings and adjustments of the elevation angle and azimuth direction are not part of the invention.

When an object is moving, the calculations and height adjustment are repeated sufficiently often to allow following of the moving object. The moving object may typically be a vehicle or a person that may carry a radio or just be followed as in the case of the communication or sensor element being a radar antenna or a night or day camera.

The communication may include any signals requiring Line of Sight or near Line of Sight.

According to a second aspect of the invention there is provided a method for reducing the probability of detection of a line of sight type communication and sensor mast, the mast having an upper portion extending upwardly relatively the ground, and a lower portion closer to the ground than the upper portion, where the mast at the upper portion is equipped with at least a communication or sensor element, wherein the method includes equipping the mast with an actuator that, based on calculated instructions, is designed to alter the elevation above ground of the mast upper portion.

The method may comprise including use of data from a radio propagation analysis, from a geospatial database analysis or from a feedback analysis in the calculated instructions.

Often a telescopic mast is employed due to its simplicity, low weight and load carrying capacity. The mast may be supported by a structure. The invention is however not limited to this type of mast, but applies to any type mast that is capable of changing elevation by use of an actuator.

The actuator may be of any type such as hydraulic, pneumatic, screw spindle, wire rope or combination thereof. And elevation sensing transducer is connected preferably to the actuator.

In addition to the mast, actuator and transducer, the system includes an electronic drive. The drive is designed to calculate the required elevation of the mast upper portion based on one or more of the above mentioned data. Further, the drive controls the actuator to move the upper portion to the required elevation where signals from the transducer indicates that the elevation is correct.

The system and method according to the invention provides a useful contribution to a reduced probability of detection for a line of sight type communication and sensor mast.

BRIEF DESCRIPTION OF THE DRAWINGS

Below, an example of a preferred device system and method is explained under reference to the enclosed drawings, where.

DETAILED DESCRIPTION OF THE DRAWINGS

Figure 1:
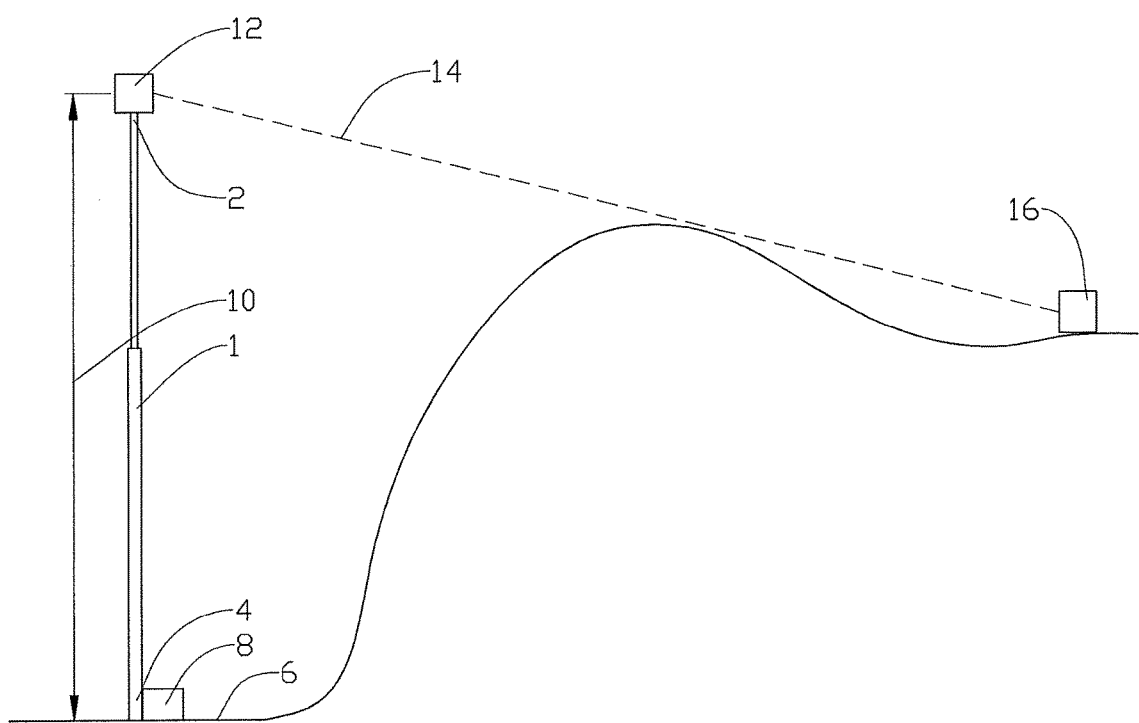
FIG. 1 shows a principal sketch of a system according to the invention in use.

On the drawings the reference number 1 denotes a telescopic mast that has an upper portion 2 and a lower portion 4. At its lower portion 4 that is close to the ground 6 the mast is equipped with an actuator 8 that is designed to move the upper portion 2 at least in the vertical direction, thus changing the elevation 10 of the upper portion 2 relative the ground 6.

The mast 1 is carrying a communication or sensor element 12 at its upper portion 2. In this embodiment the communication or sensor element 12 is an antenna that is designed for Line of Sight 14 communication with an object 16.

Figure 2:
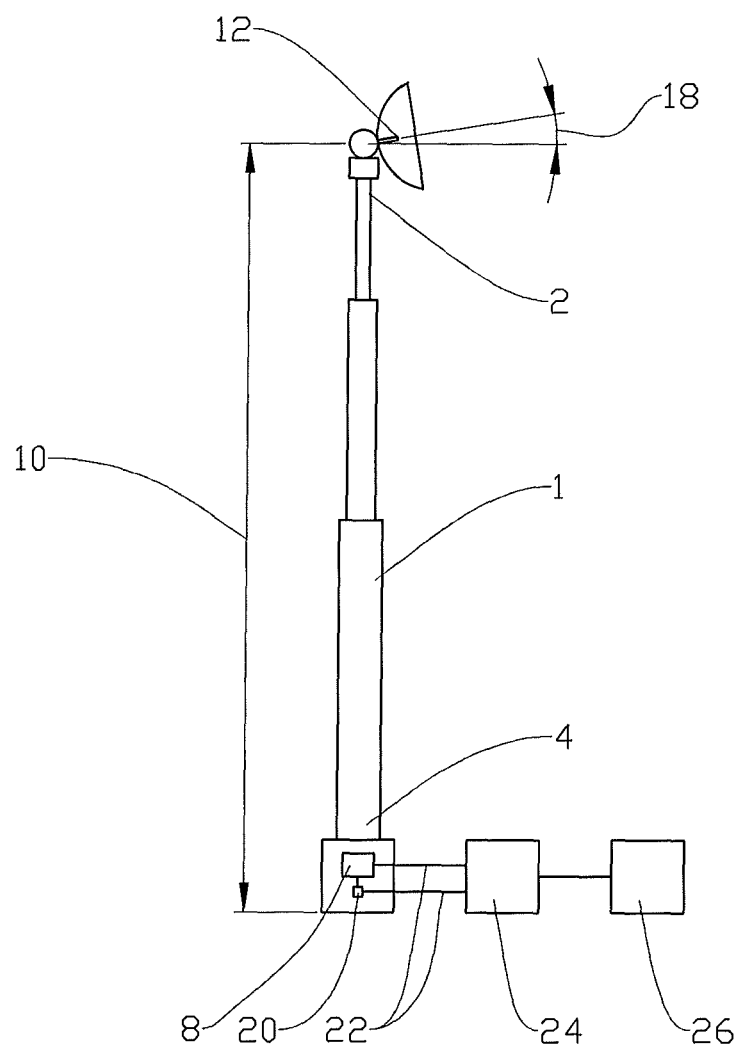
FIG. 2 shows a sketch of the system including some details.

Referring now to FIG. 2, the communication or sensor element 12 has the elevation 10, an elevation angle 18 and an azimuth direction not shown, all of which have to be adjusted in order to achieve Line of Sight 14 communication.

The actuator 8, here in the form of an electric linear worm screw actuator, has an elevation sensing transducer 20.

The actuator 8 and the transducer 20 communicates through wires 22 with a drive system 24. The drive system 24 has the necessary hardware and software to calculate the desired elevation 10 of the mast 1 upper portion 2 based on inputs from a radio (transceiver) 26 or as outlined in the general part of this document. Then the drive system 24 controls the actuator 8 with its elevation sensing transducer 20 to the desired elevation 10.

The system 24 typically extends the mast 1 until the signal quality is acceptable and then try to retract the upper portion 2 as much as possible retaining acceptable signal quality.

The drive system 24 may repeat the calculations at desired intervals, and in the case of a moving object 16, sufficiently often to enable continuous contact with the object 16.

The invention claimed is:

1. A system for a Line of Sight type communication and sensor mast, the system comprising a mast having an upper portion extending upwardly relatively relative to the ground, and a lower portion closer to the ground than the upper portion, wherein the mast at the upper portion is equipped with at least a communication or sensor element, wherein the mast is equipped with an actuator, and wherein the actuator, based on calculated instructions, is configured to alter the elevation above ground of the upper portion of the mast so as to achieve a desired signal quality with the upper portion of the mast at a lowest possible elevation to reduce the probability of detection of the mast.

2. The system according to claim 1, wherein the system is configured for first extending the mast until the signal quality is desirable and then retracting the upper portion as much as possible retaining the signal quality.

3. The system according to claim 1, wherein the calculated instructions includes data from a radio propagation analysis.

4. The system according to claim 1, wherein the calculated instructions includes data from a geospatial database.

5. The system according to claim 1, wherein the calculated instructions includes feedback data.

6. The system according to claim 5, wherein the feedback data includes Received Signal Strength Indication data.

7. The system according to claim 1, wherein the initial elevation above ground is calculated in a mission planning system.

8. The device according to claim 1, wherein calculations and height adjustment are repeated sufficiently often to follow a moving object.

9. The device according to claim 1, wherein the communication element includes any signals requiring Line of Sight or near Line of Sight.

10. A method for using a Line of Sight type communication and sensor mast, the mast having an upper portion extending upwardly relative to the ground, and a lower portion closer to the ground than the upper portion, wherein the mast at the upper portion is equipped with at least a communication or sensor element, and an actuator, the method comprising altering the elevation above ground of the upper portion of the mast, based on calculated instructions, so as to achieve a desired signal quality with the upper portion of the mast at a lowest possible elevation to reduce the possibility of detection of the mast.

11. The method according to claim 10, wherein the method comprises extending the mast until the signal quality is acceptable and then retracting the upper portion as much as possible retaining the signal quality.

12. The system according to claim 10, wherein the method comprises including use of data from a radio propagation analysis in the calculated instructions.

13. The system according to claim 10, wherein the method comprises including data from a geospatial database analysis in the calculated instructions.

14. The system according to claim 10, wherein the method comprises including data from a feedback analysis in the calculated instructions.

\* \* \* \* \*